US006859262B2

(12) United States Patent
Nguyen

(10) Patent No.: US 6,859,262 B2
(45) Date of Patent: Feb. 22, 2005

(54) REDISTRIBUTING RADIATION GUIDE

(75) Inventor: Tue Nguyen, Fremont, CA (US)

(73) Assignee: Tegal Corporation, Petaluma, CA (US)

(*) Notice: Subject to any disclaimer, the term of this patent is extended or adjusted under 35 U.S.C. 154(b) by 429 days.

(21) Appl. No.: 09/730,690

(22) Filed: Dec. 6, 2000

(65) Prior Publication Data

US 2002/0066869 A1 Jun. 6, 2002

(51) Int. Cl.[7] .................................................. G03B 27/54

(52) U.S. Cl. .......................................... 355/67; 438/487

(58) Field of Search .................................... 438/437, 14

(56) References Cited

U.S. PATENT DOCUMENTS 6,452,662 B2 * 9/2002 Mulkens ...................... 355/67
6,528,397 B1 * 3/2003 Taketomi .................... 438/487

* cited by examiner

*Primary Examiner*—John F Niebling
*Assistant Examiner*—André C. Stevenson
(74) *Attorney, Agent, or Firm*—Fliesler Meyer LLP

(57) ABSTRACT

A system delivers radiation to a substrate with a radiation source to generate radiation having a source intensity distribution pattern; and a redistribution radiation guide adapted to receive the radiation from the radiation source and to direct the radiation from one region to different regions on the substrate so that the substrate intensity distribution pattern is different from the source pattern.

22 Claims, 10 Drawing Sheets

REDISTRIBUTING RADIATION GUIDE

BACKGROUND

This invention relates to apparatus and methods to thermally process substrates.

In many semiconductor-manufacturing processes, substrates are thermally processed in a series of one or more phases. For example, some thermal processes include a pre-heating phase during which the substrate is heated to an initial temperature before the substrate is loaded completely into a processing chamber and processed with a prescribed heating cycle. To achieve the required device performance, yield, and process repeatability, the temperature of a substrate such as a semiconductor wafer is strictly controlled during processing. For example, semiconductor devices have layers that are tens of angstroms thick and this thickness uniformity must be held to within a few percent. Potential problems arising from a non-uniform substrate temperature include semiconductor crystal slips that can destroy devices through which the slip passes. Additionally, certain semiconductor processes, such as those to form an epitaxial layer, require a uniform temperature to obtain uniform resistivity. These requirements dictate that temperature variations across the substrate or wafer during processing be limited to a tight range.

To achieve the desired substrate temperature, certain process chambers use one or more high intensity heating elements, such as lamps, positioned over the substrate to be heated. Potential problems with the use of high intensity lamps as a heat source, particularly for larger diameter wafers include difficulties in maintaining a uniform temperature across the wafer. Further, temperature differences can arise during heating/cooling transients and during processing. The interior walls of typical lamp based systems are usually relatively cool and are not heated to a uniform equilibrium process temperature as in a conventional batch furnace. Different radial locations on the wafer surface receive different fractions of their incident radiation from each of the lamps and have different views of the relatively cool side walls. As a result, it may be difficult to ensure that the net radiant heat flux, and hence the equilibrium temperature may not be uniformly maintained on the wafer.

SUMMARY

In one aspect, a system delivers radiation to a substrate with a radiation source to generate radiation having a source intensity distribution pattern; and a redistribution radiation guide adapted to receive the radiation from the radiation source and to direct the radiation from one region to different regions on the substrate so that the substrate intensity distribution pattern is different from the source pattern.

Implementations of the above aspect may include one or more of the following. The redistribution radiation guide directs the radiation from one region to different regions by spreading out the source section. The radiation guide includes a plurality of spreading components for spreading a region of the radiation source to a larger region on the substrate. The spreading component of the radiation guide distributes a local concentration section of the radiation source over a large region on the substrate for a more uniform distribution of radiation source on the substrate. The redistribution radiation guide directs the radiation from one region to different regions by shifting the source section when the radiation guide is moving. The radiation guide comprises a plurality of shifting components for shifting a region of the radiation source to a different region on the substrate. The shifting component of the radiation guide spreads a local concentration section of the radiation source over a large region on the substrate for a more uniform distribution of radiation source on the substrate when the radiation guide is moving. The shifting components of the radiation guide shift a ring section of the radiation source to a ring section on the substrate, and shift a portion of the ring section of the radiation source progressively to a portion of a ring section on the substrate so that a ring portion of the source is directed to many different ring portions of the substrate when the radiation guide is moving. The ring section on the substrate is wider than the ring section of the radiation source to spread the radiation source over a large region. The radiation source comprises one or more lamps. The radiation is thermal radiation for heating the substrate. The radiation is visible light radiation for lighting the substrate. A substrate temperature sensor can be coupled to the substrate. The substrate temperature sensor can be a pyrometer or a thermocouple in contact with the substrate. A motor can be coupled to the radiation guide to move the radiation guide. A processor can be coupled to a substrate temperature sensor and to the motor. The motor can rotate the radiation guide, or can rock the thermal radiation guide in an oscillatory manner. The motor can rock the thermal radiation guide in more than one dimensions. The radiation source can be positioned substantially parallel to the substrate and the radiation guide can be positioned in a direct path between the radiation source and the substrate. The radiation guide can be a light pipe. The radiation source can be positioned a at first angle to the substrate and the radiation guide is positioned at a second angle to the substrate to direct radiation from the radiation source to the substrate. The radiation source can be positioned at a 90 degree angle to the substrate and the radiation guide is positioned at a 45 degree angle to the substrate. The radiation guide can be a surface to reflect radiation from the radiation source to the substrate.

In another aspect, a method for heating a semiconductor substrate includes generating thermal radiation using a radiation source; and sending the thermal radiation through an uniformity radiation guide to the substrate.

In yet another aspect, a system to process a substrate includes a chamber adapted to receive the substrate; a radiation source coupled to the chamber to generate radiation; and a uniformity radiation guide adapted to receive the radiation from the radiation source and to direct the radiation to different regions on the substrate with a substrate intensity distribution pattern different from the source pattern.

Implementations of the above aspect may include one or more of the following. The method includes measuring the substrate temperature to provide a closed-loop feedback control. A pyrometer can measure substrate temperature. The target region can be rotated. The target region can be randomly selected. The method includes receiving temperature from a temperature sensor; and actuating a motor to rotate the radiation guide and to sweep the thermal radiation over the substrate to maintain a uniform substrate temperature.

In another aspect, a system delivers radiation to a substrate with a radiation source to generate radiation; and a radiation guide adapted to direct the radiation from the radiation source to the substrate, the guide being rotated to reflect the radiation to one or more dispersed regions.

In yet another aspect, a system processes a substrate. The system includes a chamber adapted to receive the substrate; a radiation source coupled to the chamber to generate radiation; and a radiation guide adapted to direct the radiation from the radiation source to the substrate, the guide spreading the radiation to one or more dispersed regions.

Advantages of the system may include one or more of the following. The system avoids damage to a substrate and undesirable process variations by providing a precise temperature control of the substrate during fabrication or manufacturing. The system minimizes the number of components in the chamber. Thus, potential sources of particulate contamination in the chamber are reduced. The system allows the heating temperature to be rapidly raised or lowered. The control of heating temperature can be readily effected by controlling the electricity to be supplied to the heat source. Contamination is reduced since the substrate is heated without being brought into contact with the heat source. Energy consumption is reduced because only one heat source is reduced and the heat source enjoys high-energy efficiency. The system is smaller in size and less costly, compared with other heating furnaces such as resistive furnaces and high-frequency furnaces. The temperature of the substrate is accurately controlled. Further, the increased accuracy in substrate temperature determination is provided in an apparatus that is simple to assemble, reliable and inexpensive.

Other features and advantages will become apparent from the following description, including the drawings and the claims.

DESCRIPTION

In the following description, the temperature of a substrate is discussed. The term "substrate" broadly covers any object that is being processed in a thermal processing chamber and the temperature of which is being measured during processing. The term "substrate" includes, for example, semiconductor wafers, flat panel displays, and glass plates or disks.

Figure 1:
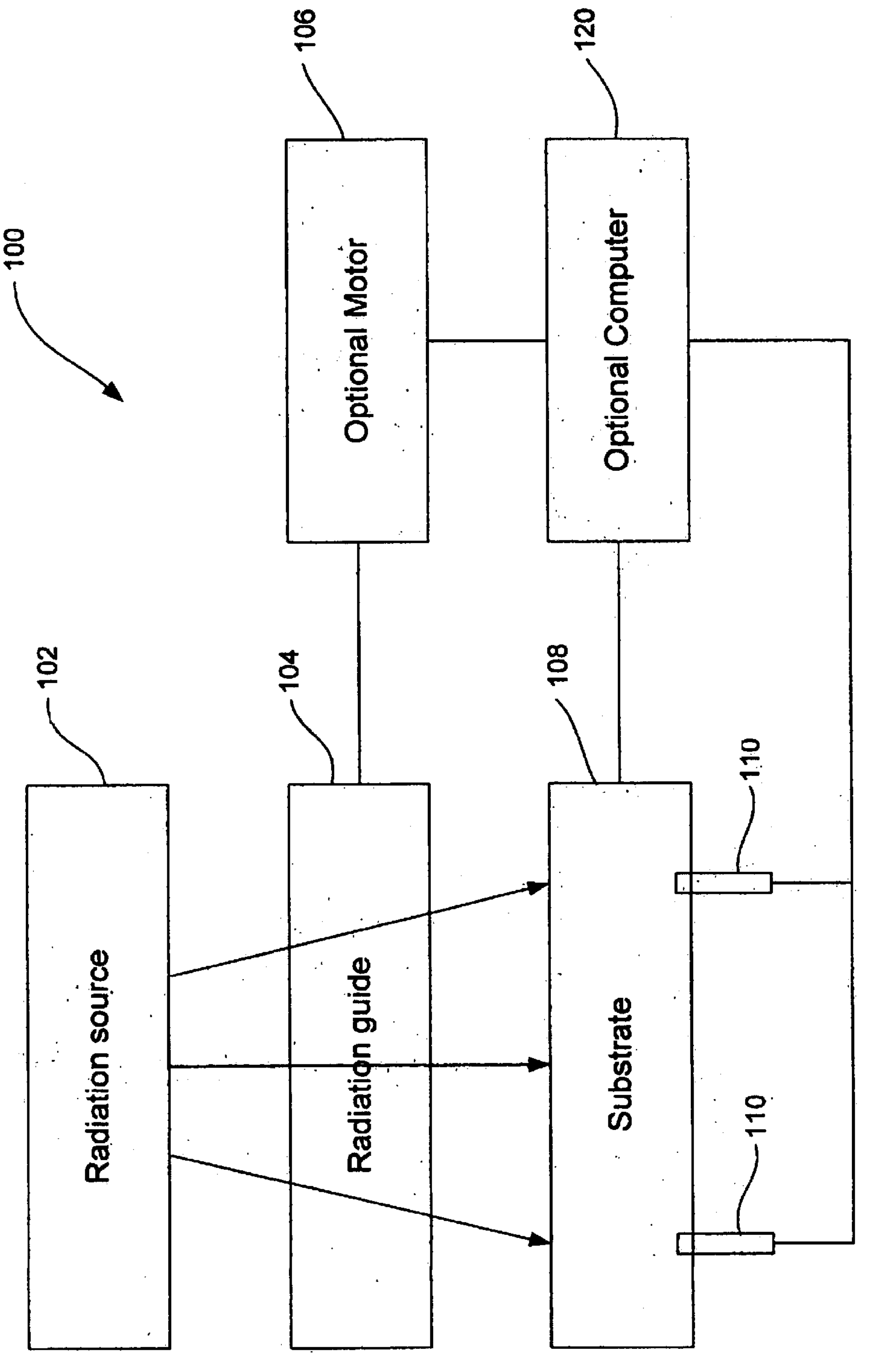
FIG. 1 shows a cross sectional view of one embodiment of a system to deliver radiation onto a substrate or wafer.

FIG. 1 shows a cross sectional view of one embodiment of a system 100 to deliver radiation such as heat onto a substrate or wafer 110. The wafer 110 may be any of a number of semiconductor materials such as silicon, silicon carbide, gallium arsenide, gallium nitride, for example. If desired, these semiconductor materials can be in combination with thin insulators and/or metal layers. The semiconductor wafer 110 is positioned in a reactor chamber (not shown) above a susceptor (not shown).

The system 100 includes a radiation source 102 that generates thermal radiation in one embodiment. Openings are provided near a seal between the radiation source 102 and the body of the radiation source 102 to permit air to flow around and over the radiation source 102. In one implementation, the radiation source 102 is a heat lamp including ultraviolet (UV) discharge lamps such as mercury discharge lamps, metal halide visible discharge lamps, or halogen infrared incandescent lamps, for example. The wavelength range for the UV spectrum is from about 200 nanometers to about 400 nanometers, and the wavelength range for the visible spectrum is from about 400 nanometers to about 800 nanometers.

The thermal radiation is sent through a radiation guide 104 to the wafer 110. In one implementation, the light guide 104 is substantially circular and covers the wafer 110. The thermal radiation guide 104 directs thermal radiation from the heat source to the substrate. In one embodiment, the thermal radiation guide 104 has one or more openings to allow thermal radiation to pass through the radiation guide 104 and reach the substrate 110. In another embodiment, the radiation guide 104 includes fiber optic cable bundles or light pipes to transmit radiation from the radiation source 102 to the substrate 110. The light pipes deliver highly collimated radiation from the radiation source 102. The light pipes can be made of sapphire with relatively small light scattering coefficients and with high transverse light rejection. The light pipes can be made of any appropriate heat-tolerant and corrosion-resistant material such as quartz that can transmit the sampled radiation to the pyrometer. Suitable quartz fiber light pipes, sapphire crystal light pipes, and light pipe/conduit couplers may be obtained from the Luxtron Corporation-Accufiber Division, 2775 Northwestern Parkway, Santa Clara, Calif. 95051-0903.

The radiation source 102 may be divided into a plurality of zones which are located in a radially symmetrical manner. The power supplied to the different zones can be individually adjusted to allow the radiative heating of different areas of substrate 110 to be precisely controlled.

A motor 106 moves the radiation guide 104 in a sweeping pattern to deliver the thermal radiation over the substrate 110. In one embodiment, the motor 106 "rocks" or oscillates the thermal radiation guide 104 so that the radiation is swept back and forth over the substrate 110. The rocking motion can also be performed in two-dimensional movements. The motor is controlled by a computer 120 using a suitable high voltage I/O motor controller board.

The computer 120 achieves the required level of temperature uniformity, reliable real-time, multi-point temperature measurements through a closed-loop temperature control with one or more substrate temperature sensors 108 for sensing substrate temperature. The substrate temperature sensor can be a pyrometer 110, which is a non-contact temperature probe. The pyrometers are configured to measure substrate temperature based upon the radiation emitted from a substrate being heated by the radiation source 102. The substrate temperature may be controlled within a desired range by the computer 120 that adjusts the radiation source 102 based upon signals received from one or more of the pyrometers. Additionally, contact probes (such as thermocouples) may be used to monitor substrate temperatures at low temperatures.

Figure 2:
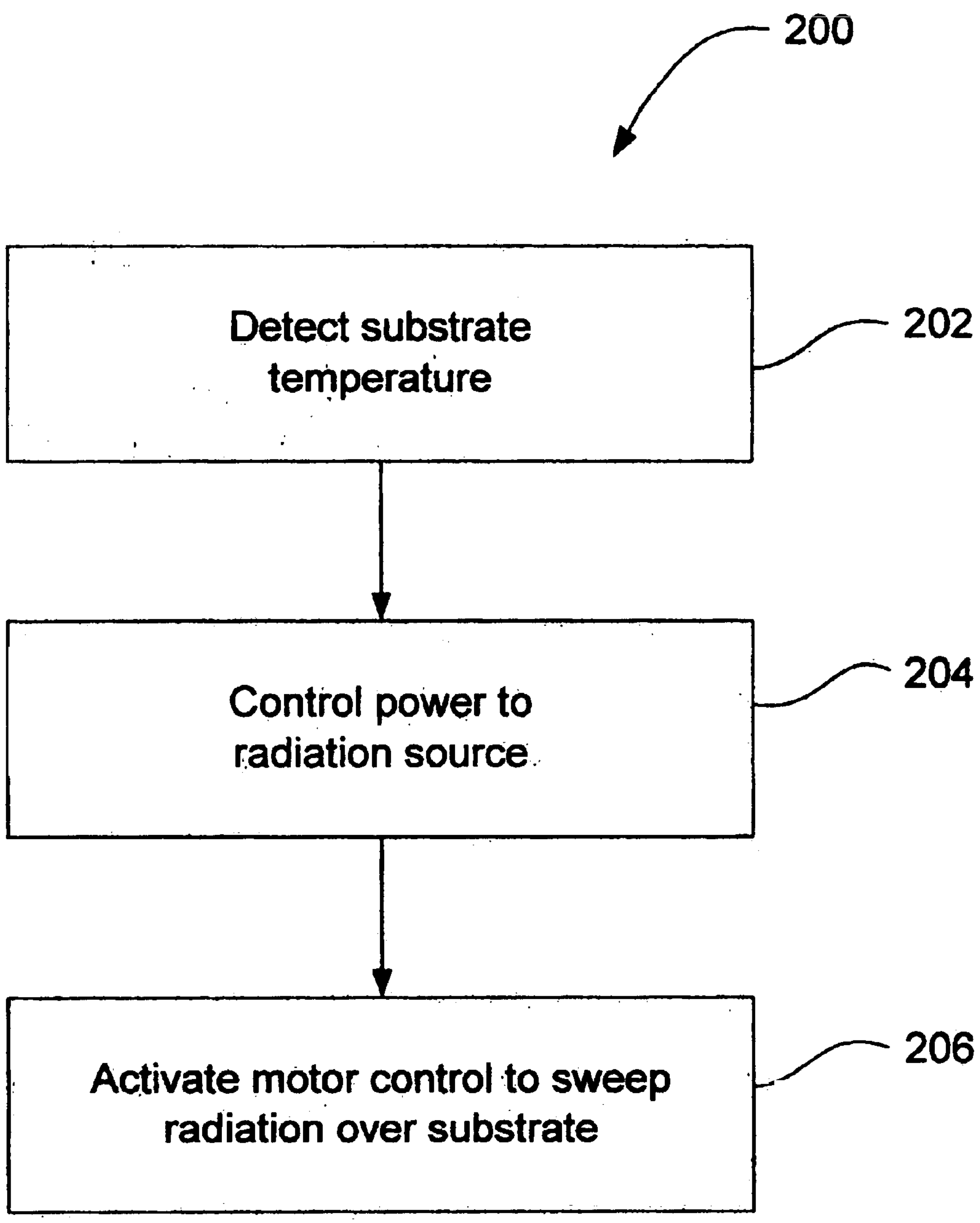
FIG. 2 shows a process for maintaining temperature uniformity based on data from a temperature sensor and motor actuations.

FIG. 2 shows a process 200 where code executable by the processor receives temperature from the temperature sensor 108. While the substrate 110 is being processed, the pyrometers 108 detect the temperatures of the substrate 110 (step 202). By indirectly obtaining the temperature of the wafer 110, the computer 120 controls the power supplied to the radiation source 102 so that the substrate 110 is maintained at a temperature required for purposes of processing the wafer (step 204). Depending on the local temperature of the substrate 110, the power to the radiation source 102 may be varied to provide temperature uniformity across the entire substrate 110. The system 100 uses feedback from the radiation source 102 to enhance substrate temperature uniformity. Once the local temperature of the substrate 110 is determined, the variation of substrate thickness with substrate radius may then be used as a guide to vary the power of the radiation source 102. For example, where the grown layer is too thick, the power to the radiation source 102 is lowered to make the substrate temperature uniform. Further, the motor 106 is actuated to sweep the thermal radiation over the substrate 110 to maintain a uniform substrate temperature (step 206).

Figure 3:
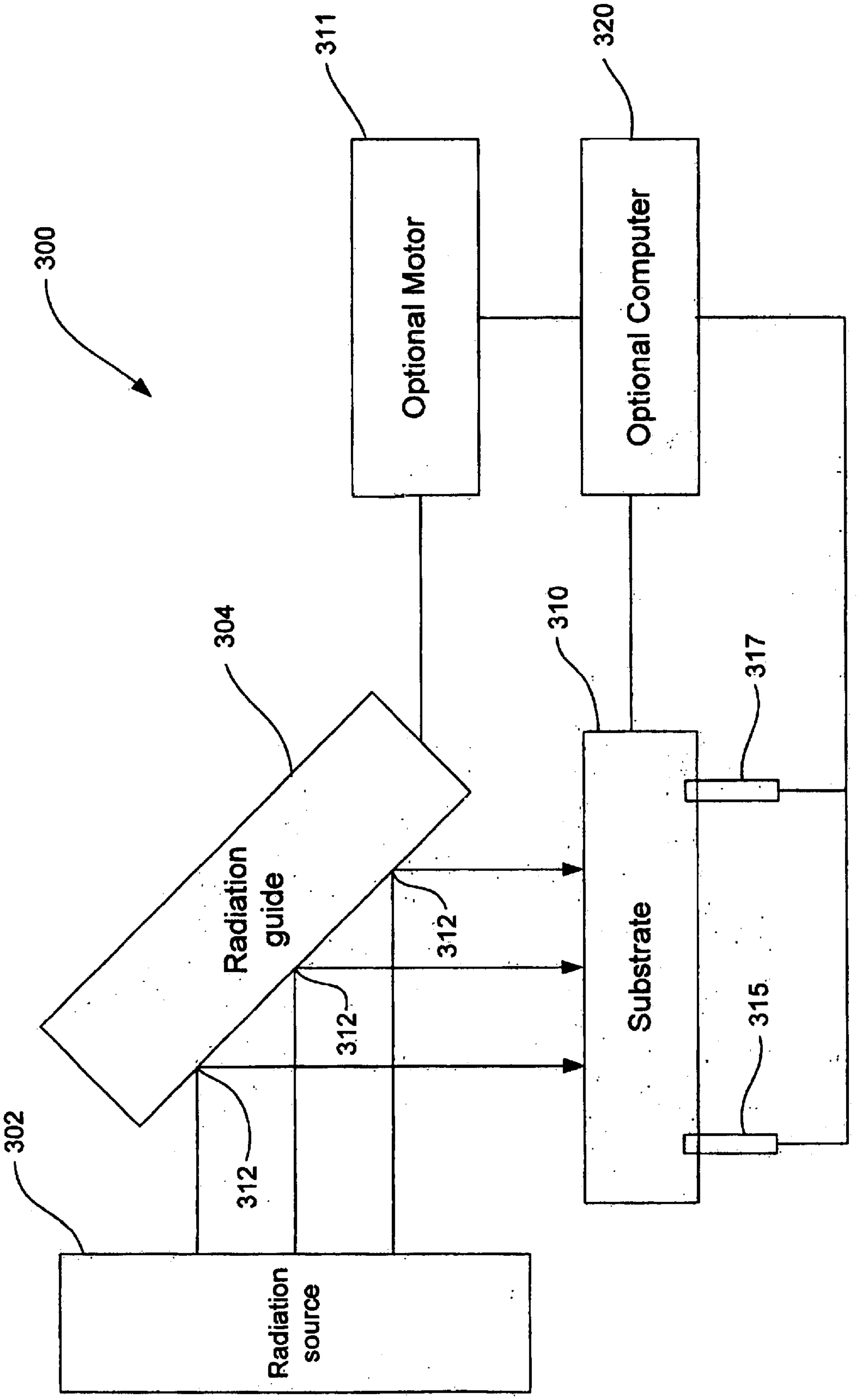
FIG. 3 shows a second embodiment of a system to uniformly deliver radiation such as heat onto the substrate.

FIG. 3 shows a second embodiment 300 of a system to uniformly deliver radiation such as heat onto the substrate 310. In this embodiment, a radiation source 302 is positioned substantially perpendicularly to the substrate 310 and a radiation guide 304 is positioned at an angle to the substrate to direct thermal radiation over the substrate 310. In one implementation, the radiation source 302 is positioned at a 90 degree angle relative to the substrate 310 and the radiation guide 304 is positioned at a 45 degree angle to the substrate 310.

The radiation guide 304 has a plurality of reflecting spots 312. When the radiation guide 304 is rotated by a motor 311, the reflecting spots 312 receive incident radiation beams from the radiation source 302 and redirects the radiation to the surface of the wafer 310. The computer 320 receives substrate temperature from pyrometers 315 and 317, and based on the temperature directs the rotation rate of the radiation guide 304 and the intensity of the radiation source 302 as necessary to ensure a uniform substrate temperature. As the radiation guide 304 rotates, radiation from the stationary radiation source or lamp 302 is redirected and is reflected onto the substrate 310.

Figure 4:
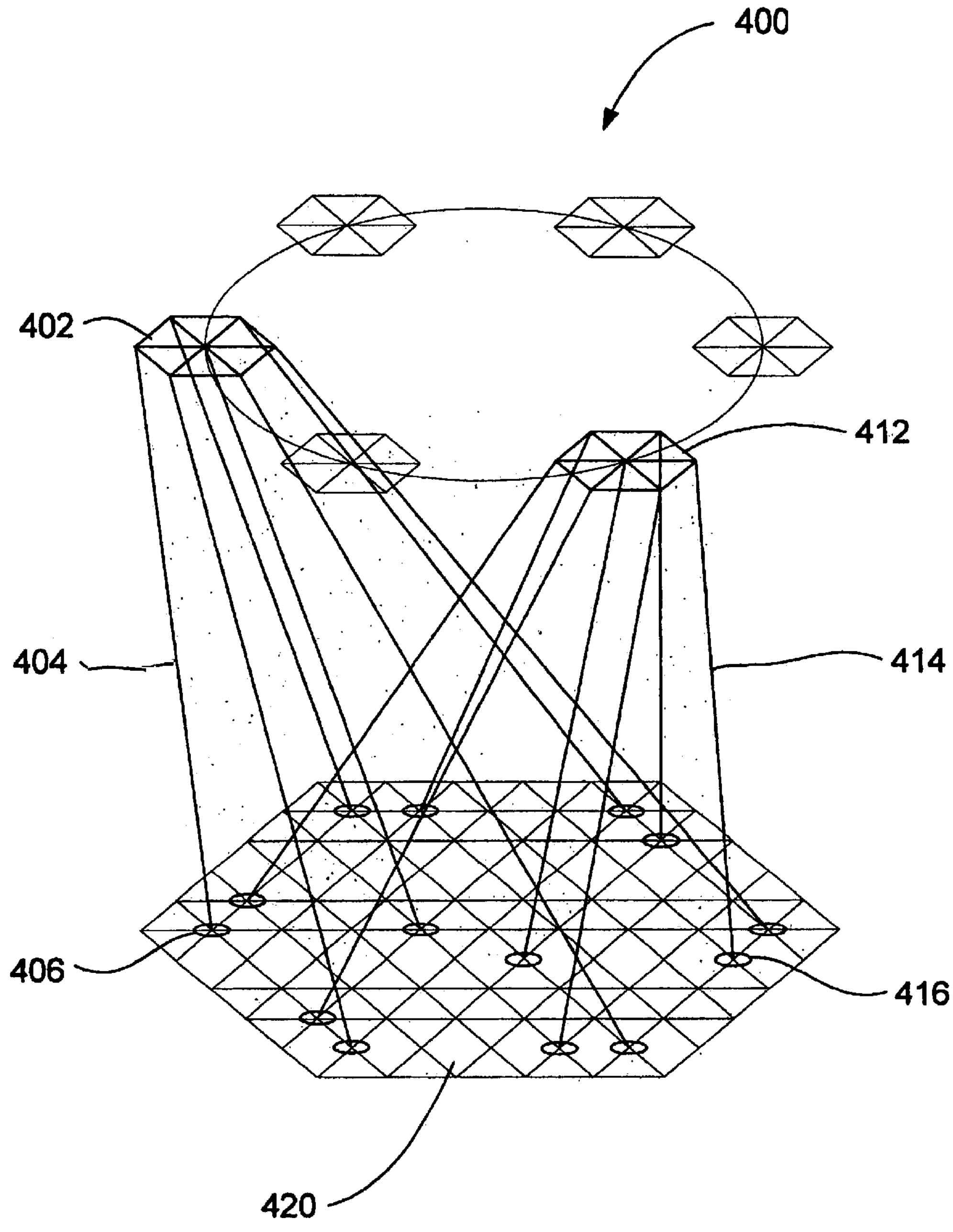
FIG. 4 shows a third embodiment of a system to uniformly deliver radiation such as heat onto the substrate.

FIG. 4 shows a third embodiment 400 of a system to uniformly deliver radiation to the substrate 420. In this embodiment, a first radiation source or lamp 402 is positioned approximately above a substrate 420. The lamp 402 has a source light pattern. A plurality of first light pipes 404 receives radiation from the lamp 402 and delivers the radiation to a plurality of dispersed spots 406 on the substrate 420. Because the light pipes deliver light in a shifted manner, the pattern rendered onto the substrate 420 differs from the source light pattern. Similarly, a second radiation source or lamp 412 is positioned approximately above the substrate 420. A plurality of second light pipes 414 receives radiation from the lamp 412 and deliver the radiation to a plurality of dispersed spots 416 on the substrate 420. In another implementation, the second light pipes 414 receive radiation from the first radiation source or lamp 402 and disperses the radiation in a different pattern than the pattern of the first radiation source 402 onto the substrate 420.

Figure 5:
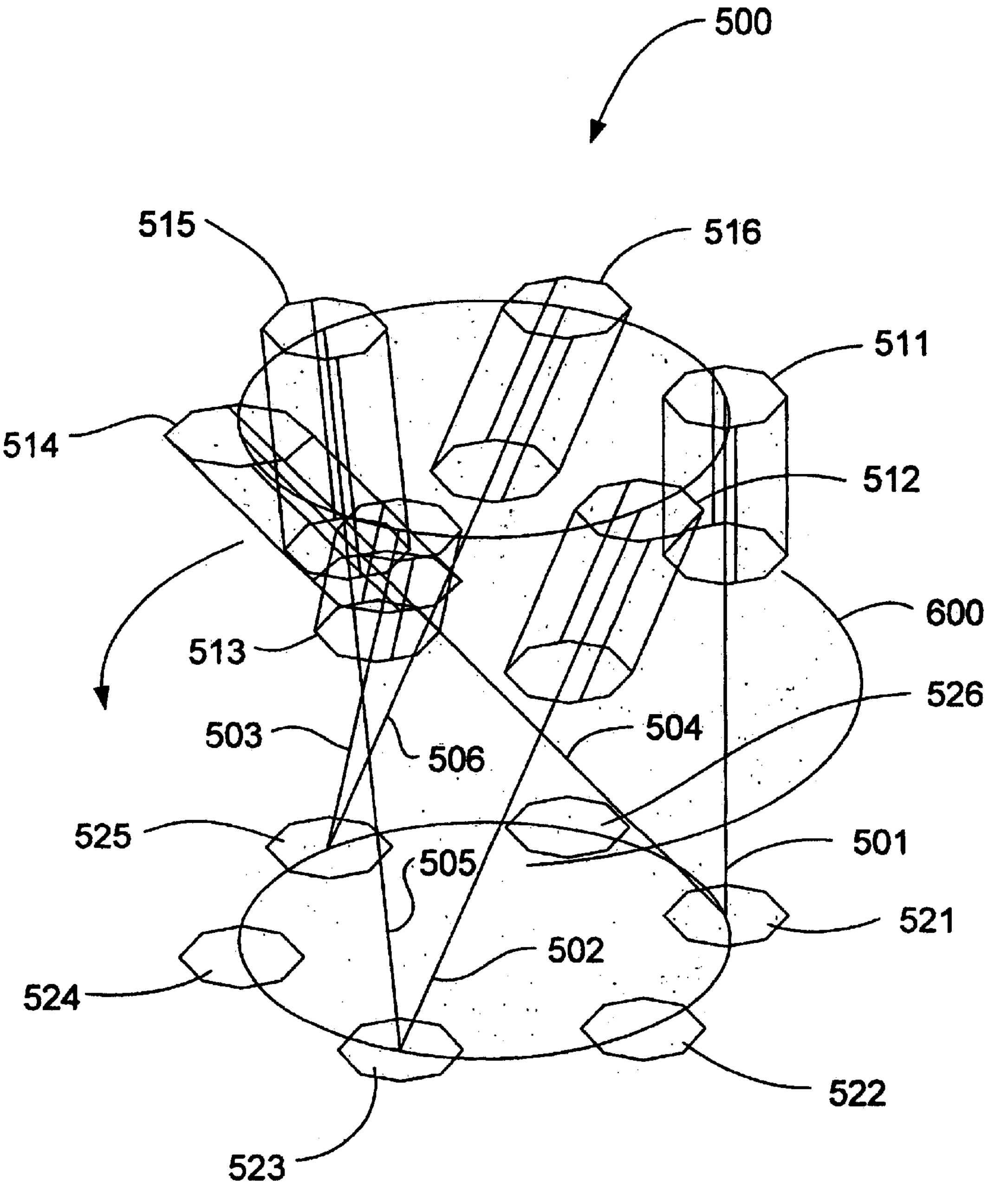
FIG. 5 shows a fourth embodiment of a system to uniformly deliver radiation such as heat onto the substrate.

FIG. 5 shows a fourth embodiment 500 of a system to spread radiation onto a substrate 110. In FIG. 5, a radiation source is positioned above light pipes 511–516. Each of the light pipes 511–516 is angled so as to shift or reposition the delivery of the radiation from the radiation source onto different spots 521, 523 and 525. The pipe 511 generates a beam 501, the pipe 512 generates a beam 502.The pipe 513 generates a beam 503, pipe 514 generates a beam 504, pipe 515 generates a beam 505, and pipe 516 generates a beam 506. Further, due to the position of the light pipes 511–516, beam 501 is delivered to spot 521, while beam 502 is delivered to spot 523, beam 503 is delivered to spot 525, beam 504 is delivered to spot 521, beam 505 is delivered to spot 523, and beam 506 is delivered to spot 525. Note that in this configuration, not all spots 521–526 on the substrate are illuminated due to the position of the light pipes 511–516.

Figure 6A:
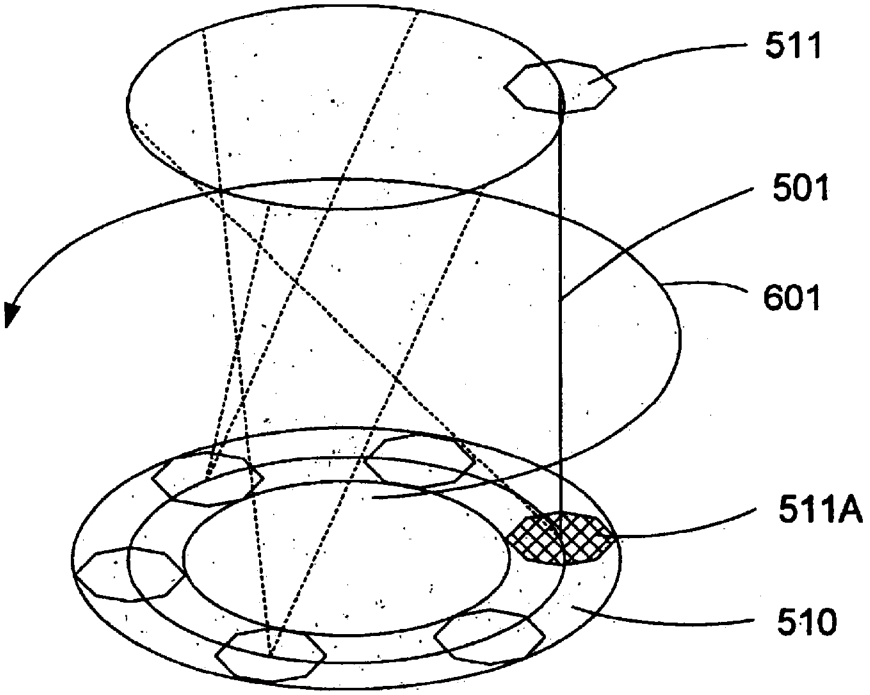
FIG. 6 shows a fifth embodiment of a system to uniformly deliver radiation such as heat onto the substrate.
Figure 6B:
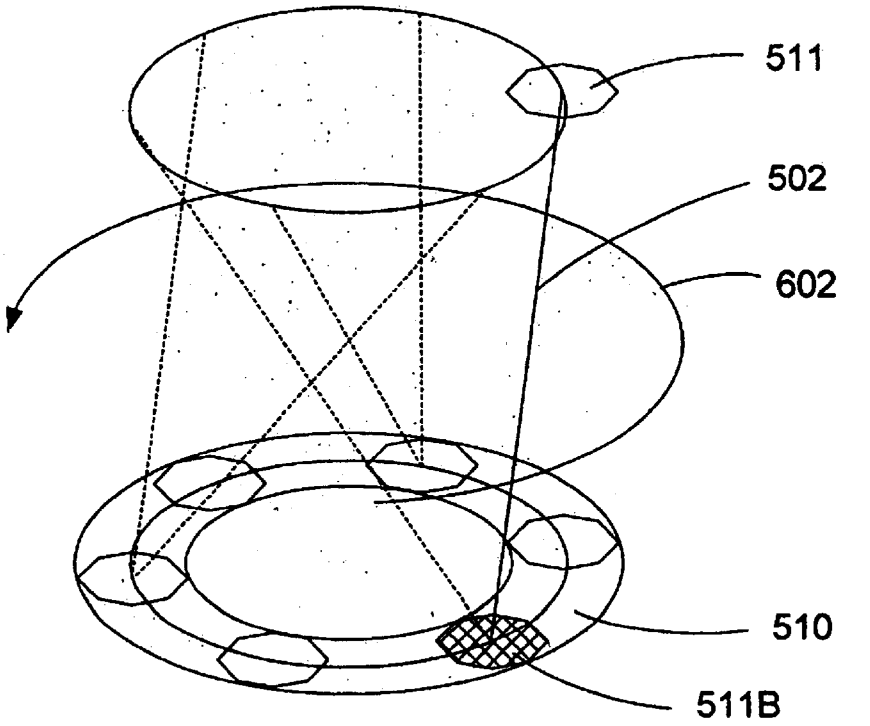
Figure 6C:
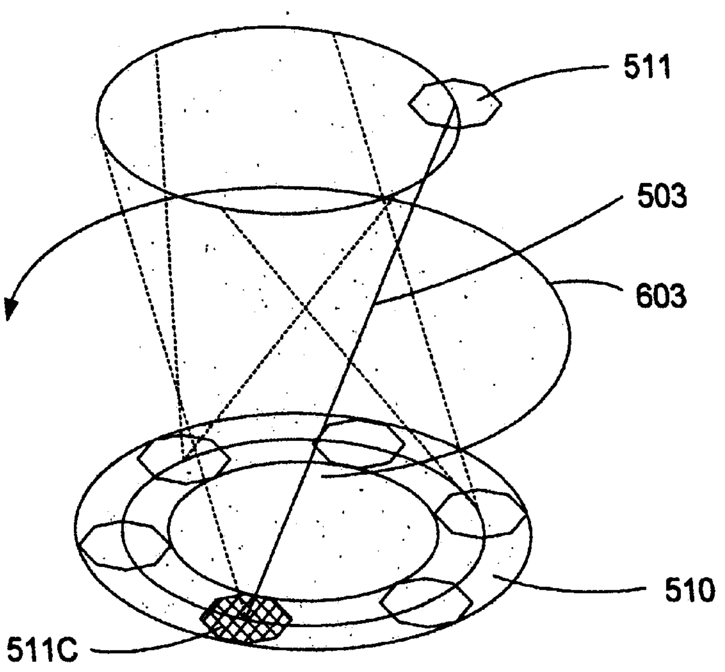
Figure 6D:
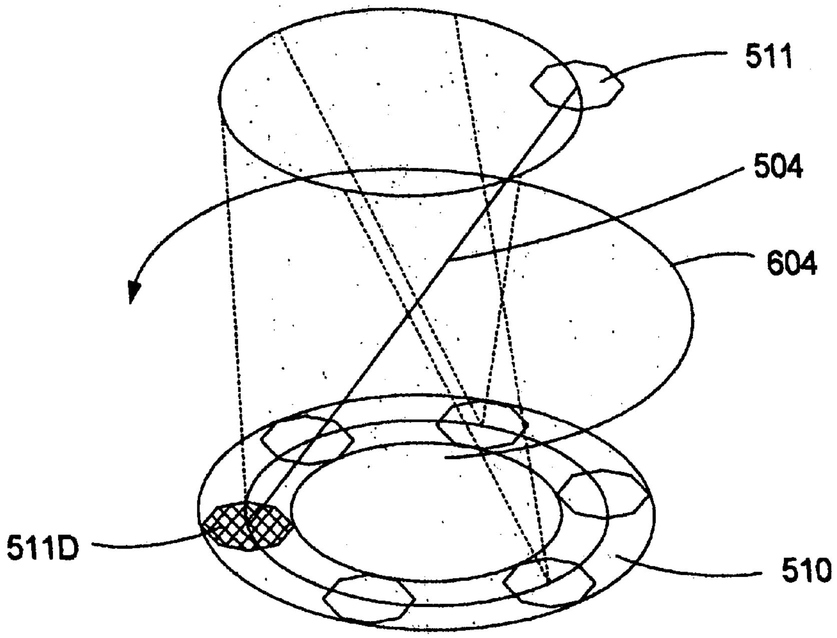
Figure 6E:
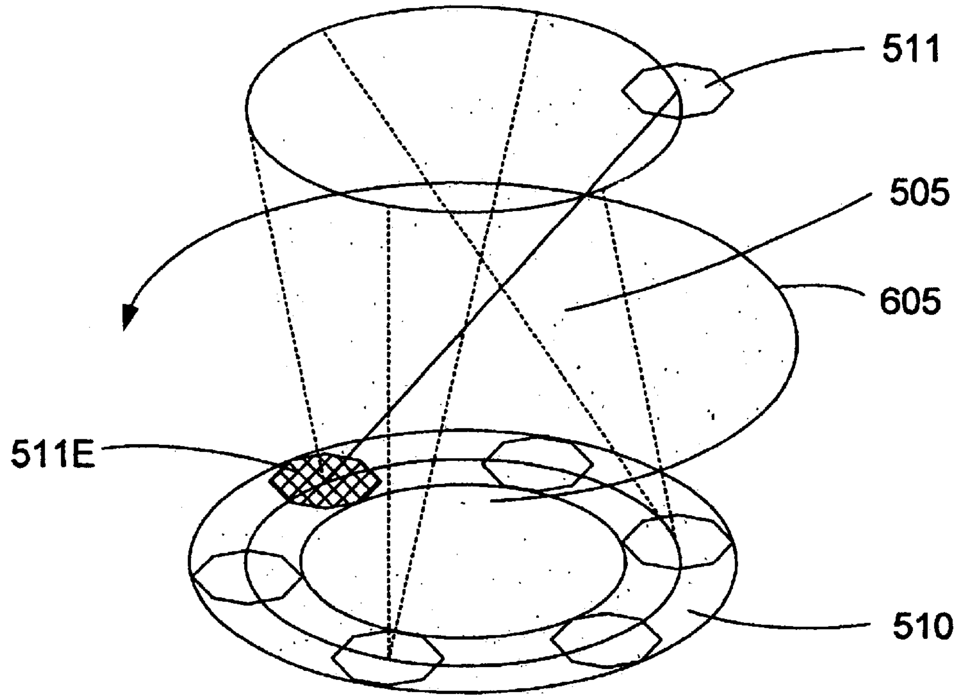
Figure 6F:
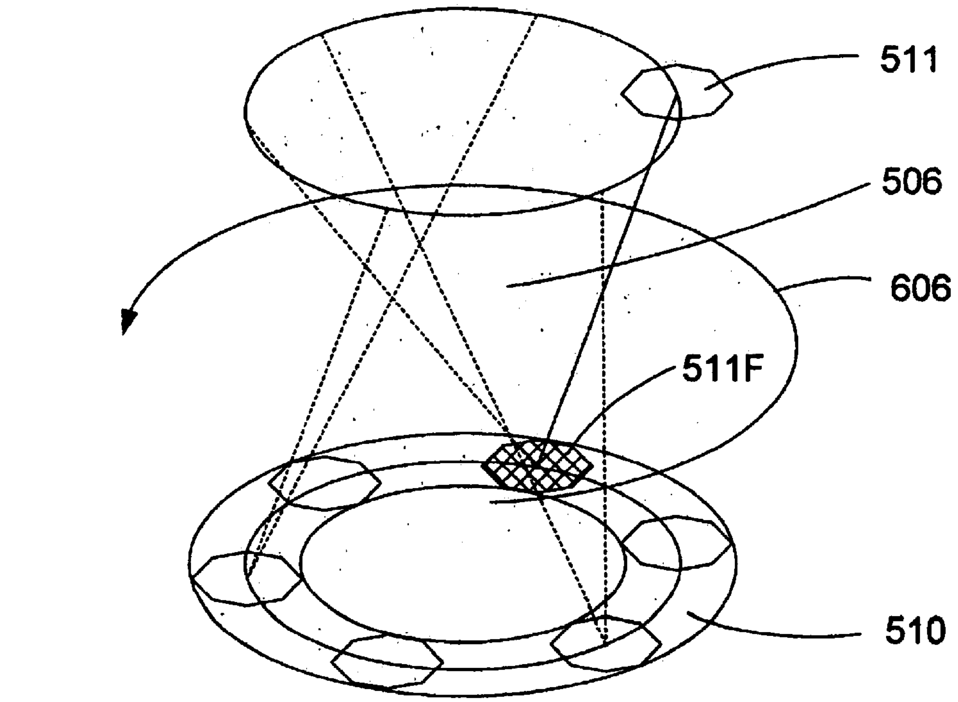

FIGS. 6A–6F show a fifth exemplary embodiment 600 of a system to spread radiation onto a substrate 510. In FIG. 6, a plurality of radiation sources are positioned above light pipes which are angled so as to shift or reposition the delivery of the radiation from the radiation sources onto a different spot on the substrate. FIG. 6A shows an exemplary light source 511 generating the beam 501. The rotation pattern of a pipe is exemplified in path 601, which represents zero degree of rotation, upon which the beam is delivered onto spot 511A. FIG. 6B shows the pipe being rotated 60 degrees counter clockwise in path 602, resulting in the illumination of spot 511B with the non-moving light source 511. FIG. 6C shows the generation of a beam 603 when the pipe is rotated 120 degrees in path 603, resulting in the illumination of spot 511C. Again, the light source 511 remains stationary. FIGS. 6D, 6E and 6F show the pipe being rotated 180 degrees, 240 degrees and 270 degrees in paths 604, 605 and 606 to generate beams 504, 505 and 506 which are delivered onto spots 511D, 511E and 511F, respectively.

As shown in FIGS. 6A–6F, with the source 511 stationary and the light pipe rotating, the spots 511A–511F are rotated in a counter direction relative to the rotation direction of the light pipe. Thus, the source is not rotated, and the delivery of the beams is achieved accurately and with minimal mechanical support without tangling of electrical wires.

Figure 7:
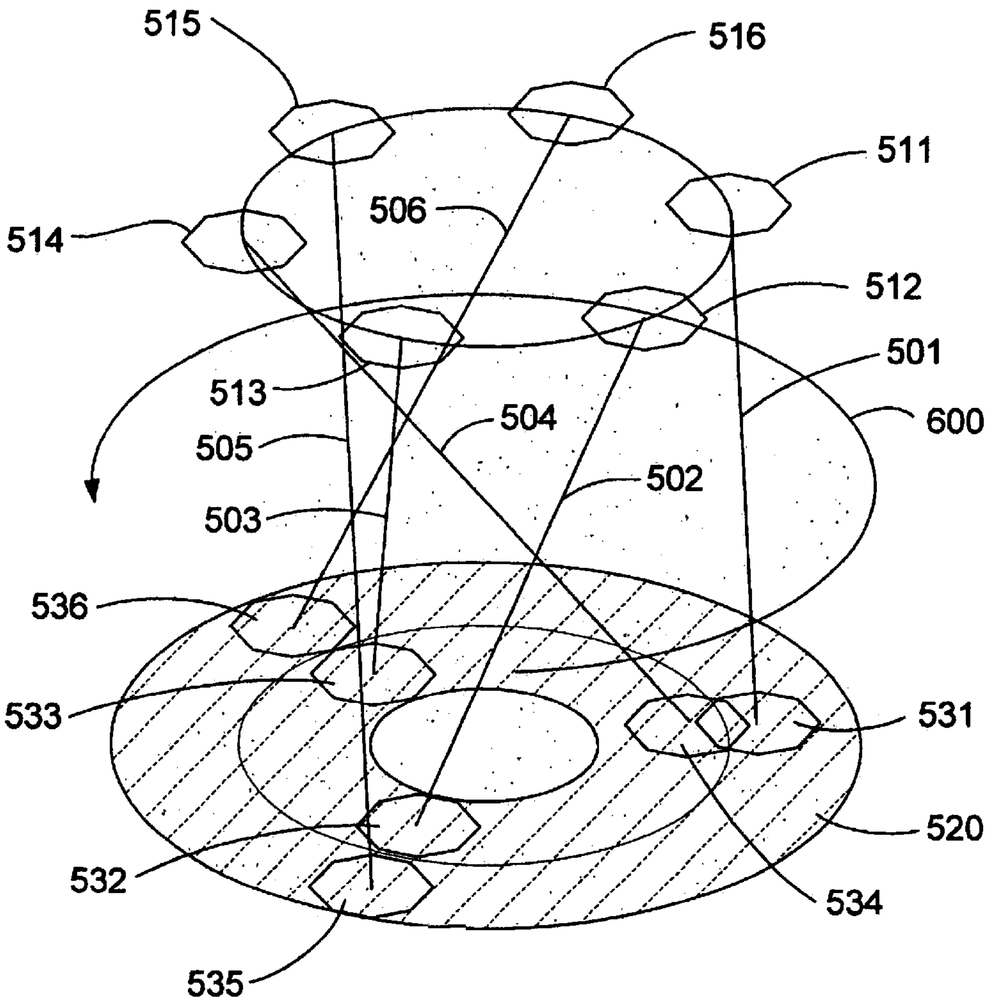
FIG. 7 shows a fifth embodiment of a system to uniformly deliver radiation such as heat onto the substrate.

FIG. 7 shows a second embodiment of the apparatus of FIGS. 5 and 6. In this embodiment, a radiation source is positioned above light pipes 511–516. Each of the light pipes 511–516 is angled so as to shift or reposition the delivery of the radiation from the radiation source onto pairs of spots 531–534, 532–535 and 533–536. The pipe 511 generates beam 501, pipe 512 generates beam 502, pipe 513 generates beam 503, pipe 514 generates beam 504, pipe 515 generates the beam 505, and pipe 516 generates beam 506. Further, due to the position of the light pipes 511–516, beam 501 is delivered to spot 531, while beam 502 is delivered to spot 532, beam 503 is delivered to spot 533, beam 504 is delivered to spot 533, beam 505 is delivered to spot 535, and beam 506 is delivered to spot 536. Note that in this configuration, the illuminated spots are spread and delivered to a larger range than the focused spots of FIG. 5.

Figure 8:
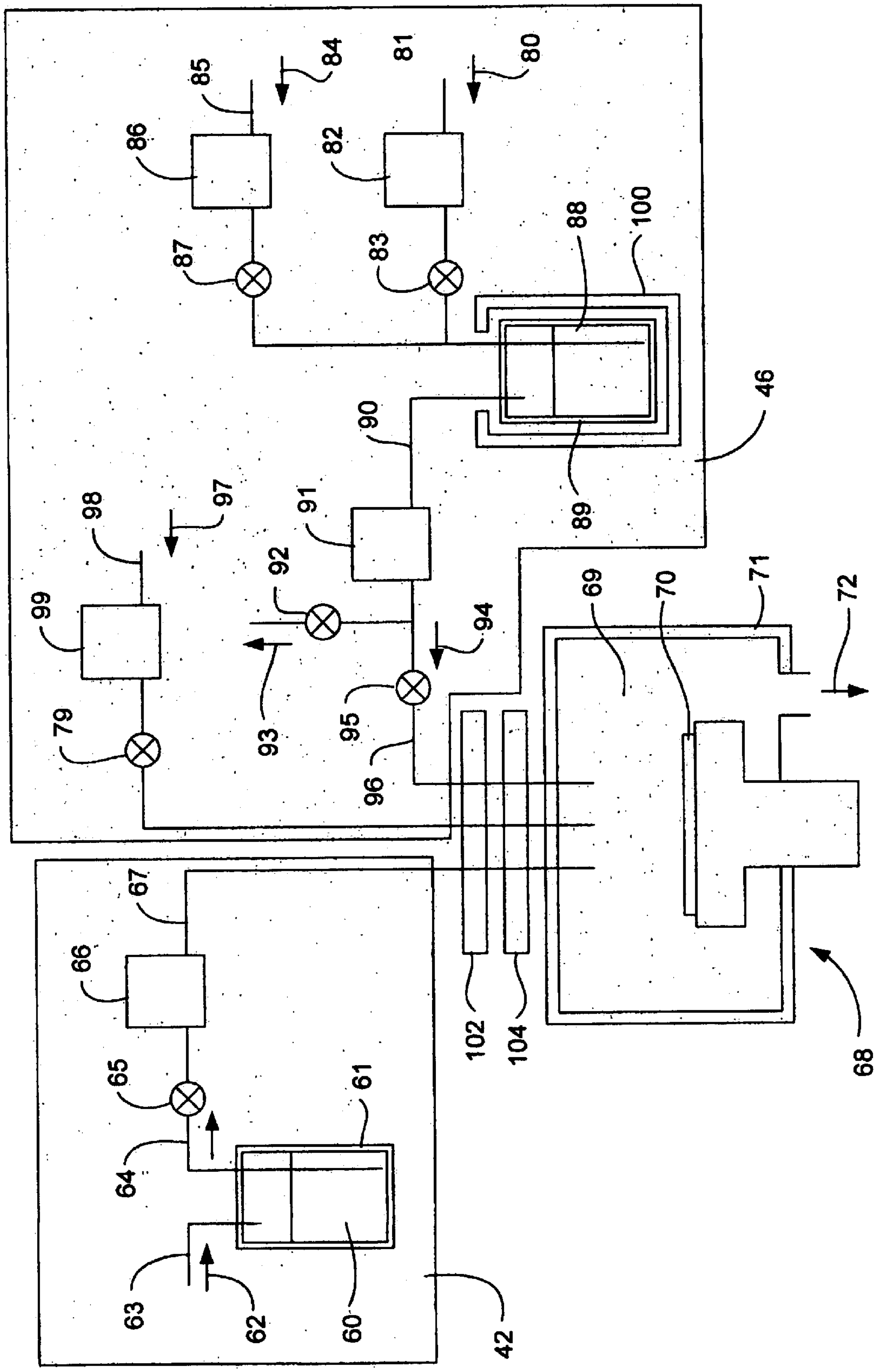
FIG. 8 shows an exemplary an apparatus for liquid and vapor precursor delivery with uniformly heated substrates.

The above heating system can be used in an exemplary an apparatus for liquid and vapor precursor delivery using either the system 100 or the system 300. As shown in FIG. 8, an apparatus 40 includes a chamber 44 such as a CVD chamber. The chamber 40 includes a chamber body that defines an evacuable enclosure for carrying out substrate processing. The chamber body has a plurality of ports including at least a substrate entry port that is selectively sealed by a slit valve and a side port through which a substrate support member can move. The apparatus 40 also includes a vapor precursor injector 46 connected to the chamber 44 and a liquid precursor injector 42 connected to the chamber 40.

In the liquid precursor injector 42, a precursor 60 is placed in a sealed container 61. An inert gas 62, such as argon, is injected into the container 61 through a tube 63 to increase the pressure in the container 61 to cause the copper precursor 60 to flow through a tube 64 when a valve 65 is opened. The liquid precursor 60 is metered by a liquid mass flow controller 66 and flows into a tube 67 and into a vaporizer 68, which is attached to the CVD chamber 71. The vaporizer 68 heats the liquid causing the precursor 60 to vaporize into a gas 69 and flow over a substrate 70, which is heated to an appropriate temperature by a susceptor to cause the copper precursor 60 to decompose and deposit a copper layer on the substrate 70. The CVD chamber 71 is sealed from the atmosphere with exhaust pumping 72 and allows the deposition to occur in a controlled partial vacuum.

In the vapor precursor injector 46, a liquid precursor 88 is contained in a sealed container 89 which is surrounded by a temperature controlled jacket 100 and allows the precursor temperature to be controlled to within 0.1° C. A thermocouple (not shown) is immersed in the precursor 88 and an electronic control circuit (not shown) controls the temperature of the jacket 100, which controls the temperature of the liquid precursor and thereby controls the precursor vapor pressure. The liquid precursor can be either heated or cooled to provide the proper vapor pressure required for a particular deposition process. A carrier gas 80 is allowed to flow through a gas mass flow controller 82 when valve 83 and either valve 92 or valve 95 but not both are opened. Also shown is one or more additional gas mass flow controllers 86 to allow additional gases 84 to also flow when valve 87 is opened, if desired. Additional gases 97 can also be injected into the vaporizer 68 through an inlet tube attached to valve 79, which is attached to a gas mass flow controller 99. Depending on its vapor pressure, a certain amount of precursor 88 will be carried by the carrier gases 80 and 84, and exhausted through tube 93 when valve 92 is open.

After the substrate has been placed into the CVD chamber 71, it is heated by the heat source 102 and the guide 104, as discussed above. After the substrate has reached an appropriate temperature, valve 92 is closed and valve 95 is opened allowing the carrier gases 80 and 84 and the precursor vapor to enter the vaporizer 68 through the attached tube 96. Such a valve arrangement prevents a burst of vapor into the chamber 71. The precursor 88 is already a vapor and the vaporizer is only used as a showerhead to evenly distribute the precursor vapor over the substrate 70. After a predetermined time, depending on the deposition rate of the copper and the thickness required for the initial copper deposition, valve 95 is closed and valve 92 is opened. The flow rate of the carrier gas can be accurately controlled to as little as 1 sccm per minute and the vapor pressure of the precursor can be reduced to a fraction of an atmosphere by cooling the precursor 88. Such an arrangement allows for accurately controlling the copper deposition rate to less than 10 angstroms per minute if so desired. Upon completion of the deposition of the initial copper layer, the liquid source delivery system can be activated and further deposition can proceed at a more rapid rate.

The system allows the substrates to have temperature uniformity through reliable real-time, multi-point temperature measurements in a closed-loop temperature control. The control portion is implemented in a computer program executed on a programmable computer having a processor, a data storage system, volatile and non-volatile memory and/or storage elements, at least one input device and at least one output device.

Each computer program is tangibly stored in a machine-readable storage medium or device (e.g., program memory or magnetic disk) readable by a general or special purpose programmable computer, for configuring and controlling operation of a computer when the storage media or device is read by the computer to perform the processes described herein. The invention may also be considered to be embodied in a computer-readable storage medium, configured with a computer program, where the storage medium so configured causes a computer to operate in a specific and predefined manner to perform the functions described herein.

The present invention has been described in terms of several embodiments. The invention, however, is not limited to the embodiment depicted and described. For instance, the radiation source can be a radio frequency heater rather than a lamp. Hence, the scope of the invention is defined by the appended claims.

What is claimed is:

1. A system to deliver radiation to a substrate, comprising:

a radiation source to generate radiation having a source intensity distribution pattern;

a redistribution radiation guide adapted to receive the radiation from the radiation source and to direct the radiation from one region to different regions on the substrate so that the substrate intensity distribution pattern is different from the source pattern; and a substrate temperature sensor coupled to the substrate.

2. The system of claim 1, wherein the substrate temperature sensor is a pyrometer or a thermocouple in contact with the substrate.

3. The system of claim 1, wherein the redistribution radiation guide directs the radiation from one region to different regions by spreading out the source section.

4. The system of claim 1, wherein the radiation guide comprises a plurality of spreading components for spreading a region of the radiation source to a larger region on the substrate.

5. The system of claim 4, wherein the spreading component of the radiation guide distributes a local concentration section of the radiation source over a large region on the substrate for a more uniform distribution of radiation source on the substrate.

6. The system of claim 1, wherein the redistribution radiation guide directs the radiation from one region to different regions by shifting the source section when the radiation guide is moving.

7. The system of claim 1, wherein the radiation guide comprises a plurality of shifting components for shifting a region of the radiation source to a different region on the substrate.

8. The system of claim 7, wherein the shifting component of the radiation guide spreads a local concentration section of the radiation source over a large region on the substrate for a more uniform distribution of radiation source on the substrate when the radiation guide is moving.

9. The system of claim 7, wherein the shifting components of the radiation guide shift a ring section of the radiation source to a ring section on the substrate, and shift a portion of the ring section of the radiation source progressively to a portion of a ring section on the substrate so that a ring portion of the source is directed to many different ring portions of the substrate when the radiation guide is moving.

10. The system of claim 9, wherein the ring section on the substrate is wider than the ring section of the radiation source to spread the radiation source over a large region.

11. The system of claim 1, wherein the radiation source comprises one or more lamps.

12. The system of claim 1, wherein the radiation is thermal radiation for heating the substrate.

13. The system of claim 1, wherein the radiation is visible light radiation for lighting the substrate.

14. The system of claim 1, wherein the radiation guide comprises a light pipe.

15. The system of claim 1, wherein the radiation source is positioned a at first angle to the substrate and the radiation guide is positioned at a second angle to the substrate to direct radiation from the radiation source to the substrate.

16. The system of claims 15, wherein the radiation source is positioned at a 90 degree angle to the substrate and the radiation guide is positioned at a 45 degree angle to the substrate.

17. The system of claim 15, wherein the radiation guide comprises a surface to reflect radiation from the radiation source to the substrate.

18. A system to deliver radiation to a substrate, comprising:

a radiation source to generate radiation having a source intensity distribution pattern;

a redistribution radiation guide adapted to receive the radiation from the radiation source and to direct the radiation from one region to different regions on the substrate so that the substrate intensity distribution pattern is different from the source pattern; and a motor coupled to the radiation guide to move the radiation guide.

19. The system of claim 18, further comprising a processor coupled to a substrate temperature sensor and to the motor.

20. The system of claim 18, wherein the motor rotates the radiation guide.

21. The system of claim 18, wherein the motor rocks the thermal radiation guide in an oscillatory manner.

22. The system of claim 18, wherein the motor rocks the thermal radiation guide in more than one dimensions.

* * * * *